INVENTOR.
JOSEPH WISLOCKY
BY
OSTROLENK, FABER, GERB & SOFFEN
ATTORNEYS

United States Patent Office 3,427,395
Patented Feb. 11, 1969

3,427,395
STEEL INSERT FOR SEMICONDUCTOR DEVICE STUD
Joseph Wislocky, El Segundo, Calif., assignor to International Rectifier Corporation, El Segundo, Calif., a corporation of California
Filed Apr. 27, 1967, Ser. No. 634,190
U.S. Cl. 174—52          4 Claims
Int. Cl. H05k 5/02, 5/00; H01l 3/00

ABSTRACT OF THE DISCLOSURE

A steel insert having outwardly radiating sections of small cross-section are cast in copper or aluminum to form a reinforced mechanical stud for a semiconductor device. The radiating sections extend in the plate of the stud body and prevent deflection of the stud body when distorting forces are applied thereto by the compressional mounting of a semiconductor device.

---

This invention relates to studs for semiconductor devices, and more specifically relates to a novel stud structure which is mechanically reinforced by a steel insert. When semiconductor devices carried on a stud are assembled by the application of pressure between the stud and the semiconductor device, the pressure is often sufficiently high to distort the stud body. The distortion of the stud body may then apply bending stresses to the relatively fragile semiconductor wafer, thereby to fracture or otherwise damage the wafer.

The principle of the present invention is to reinforce the stud body especially against bending forces when the stud body is of a relatively soft, highly conductive material such as copper or aluminum. In particular, a steel insert is cast into the stud body with the steel insert having outwardly radiating arms of relatively small cross-sectional area in order to detract as little as possible from the thermal capacity of the stud. The radiating arms, however, impart high strength against bending stresses to the stud body.

It is, therefore, a primary object of the present invention to provide a high strength stud for receiving semiconductor devices without interfering with the thermal capacity of the stud.

Another object of this invention is to provide a steel insert which is embedded in a copper or aluminum stud for mounting a semiconductor body to prevent bowing of the stud body which could cause fracture or apply undesirable stresses to the semiconductor wafer connected thereto.

These and other objects of this invention will become apparent from the following description when taken in connection with the drawings in which.

Figure 1:
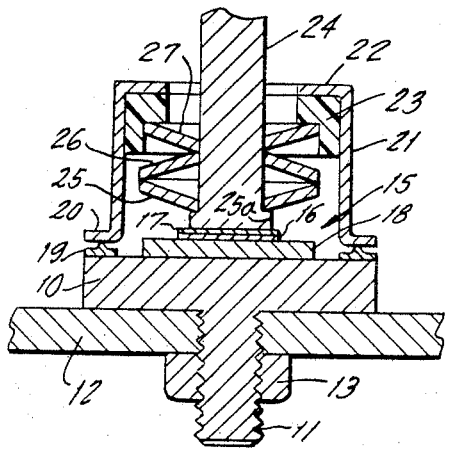
FIGURE 1 is a cross-sectional view of a typical prior art type of pressure-assembled semiconductor device.
Figure 2:
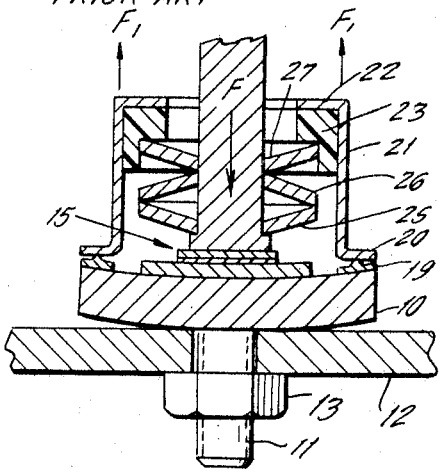
FIGURE 2 illustrates the manner in which the pressures used in the assembly of the device of FIGURE 1 can cause bowing of the stud.

Referring first to FIGURES 1 and 2, there is illustrated therein a typical semiconductor device structure which includes a copper or aluminum stud 10 which has an extending threaded base 11 which permits mounting of the device on a suitable conductive support 12 by means of a nut 13. The main portion of stud 10 receives a semiconductor wafer assembly 15 which may typically be composed of a semiconductor wafer 16 secured between molybdenum expansion plates 17 and 18 in the usual manner.

A steel welding ring 19 is fixed to the outer periphery of the upper surface of stud 10 and is welded to extending flange 20 of conductive cylindrical housing 21. Cylindrical housing 21 has an inwardly bent upper portion 22 which receives an insulation insert 23. A central extending terminal 24, having an enlarged head portion 25a, then bears atop expansion plate 17 with terminal 24 being forced downwardly beyond stud 10 by spring washers 25, 26 and 27. The pressure of washers 25, 26 and 27 cause high-pressure mechanical and electrical contact between the bottom surface of terminal 24 and the upper surface of expansion plate 17. The bottom surface of expansion plate 18 may be soldered to the upper surface of stud 10, or alternatively could also be connected by the pressure exerted by washers 25 and 27. The entire housing may then be filled with a suitable potting medium (not shown) with the housing held in position by welding of flanges 20 to the welding ring 19.

Since the stud 10 is of relatively soft material and high pressure is exerted in washers 25 to 27, it has been found that the stud 10 will bow as shown in FIGURE 2. This bowing action can exert high bending forces on the wafer 16 which is a thin and brittle member which could either crack the member or adversely affect the semiconductor device characteristics due to internal stresses.

In accordance with the present invention, a steel insert or insert of other high strength material relative to the copper or aluminum base is cast within the stud 10 to prevent the bending of the stud under the spring forces of washers 25 to 27.

Figure 4:
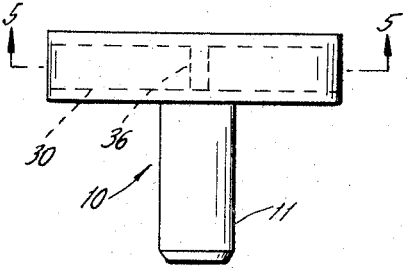
FIGURE 4 is a side plan view of a stud having the insert of FIGURE 3 cast therein.
Figure 6:
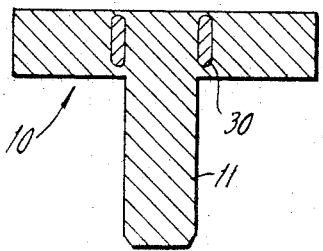
FIGURE 6 is a cross-sectional view of FIGURE 5 taken across the section lines 6—6 in FIGURE 5.
Figure 3:
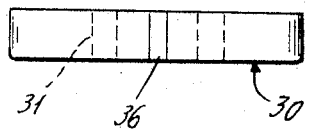
FIGURE 3 is a side plan view of a steel insert which may be cast within the stud of FIGURES 1 and 2 in order to impart substantial mechanical strength thereto without interfering with the thermal characteristic of the stud.

A typical steel insert 30 is illustrated in FIGURES 3 and 4 where the insert is comprised of a central circular hub 31 having six radially projecting arms 32 to 37 extending therefrom. The radially projecting arms 32 to 37 could typically occupy a circle having a diameter of about 2½ inches with each arm having a width of about ¼ inch which tapers downwardly as it progresses radially outwardly, as shown. The inside diameter of hub 31 may be about ⅝ of an inch, and its external diameter about 1 inch. The height of the insert 30 may be about ⅜ of an inch.

Figure 5:
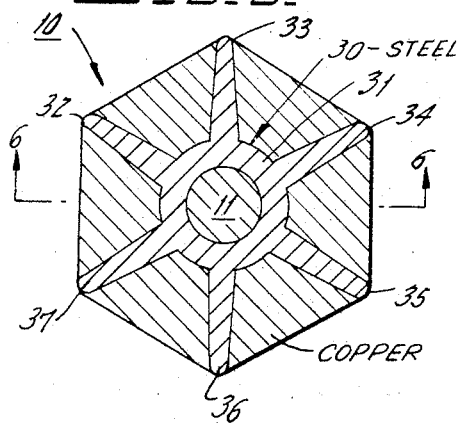
FIGURE 5 is a cross-sectional view of FIGURE 4 taken across the section lines 5—5 in FIGURE 4.

The insert 30 is then cast in the copper stud 10 by a suitable copper casting operation. If the stud is of aluminum, the insert could be cast in the aluminum body as well. The stud may take either the hexagonal shape shown in FIGURE 5, or a circular shape having a diameter of about 2½ inches.

The steel insert is axially centered within the copper stud which may have a thickness of about ½ inch. It will be observed that the radially extending arms 32 to 37 will impart substantial rigidity to the stud body against bending stresses, thereby avoiding the condition of FIGURE 2. Moreover, the bottom of steel insert 30 is only a small fraction of the mass of the copper or aluminum body of stud 10, thereby not affecting, to any substantial extent, the heat conductivity characteristics of stud 10.

It should be further noted that the radial pattern of arms 32 to 37 permit the outward radial flow of heat from the center of the stud without causing a thermal barrier to this radial heat flow. Thus, heat can easily flow outwardly of stud 10 to the support structure 12 of FIGURES 1 and 2.

Although this invention has been described with respect to its preferred embodiments, it should be understood that many variations and modifications will now be obvious to those skilled in the art, and it is preferred therefore, that the scope of the invention be limited not by the specific disclosure herein, but only by the appended claims.

The embodiments of the invention in which an exclusive privilege or property is claimed are defined as follows:

1. In a mounting stud for a semiconductor device; said mounting stud comprising a relatively large volume of a relatively high heat conductivity first material having a generally slab-like configuration and having a flat mounting surface for receiving a semiconductor wafer; the improvement which comprises a reinforcing insert within said stud of a second material having a relatively small volume compared to the volume of said stud, and a relatively low heat conductivity compared to the heat conductivity of said first material; said reinforcing insert second material having a rigidity substantially greater than the rigidity of said relatively high heat conductivity first material and being embedded in said first material and extending thereacross to resist bending of said slab-like configuration; said insert having a plurality of radiating arms extending from a central hub; said arms lying in a common plane parallel to the plane of said first material having said slab-like configuration.

2. The device of claim 1 wherein said first material is a material selected from the group which comprises copper and aluminum and alloys thereof; said second material having steel-like qualities.

3. The device of claim 1 wherein said first material is copper and said second material is steel.

4. The device of claim 1 wherein said stud has a threaded projection extending from a central portion of one surface of said slab-like configuration.

References Cited

UNITED STATES PATENTS

| 2,395,877 | 3/1946 | Keene | 29—187.5 |
| 3,011,014 | 11/1961 | Pentecost | 174—186 X |
| 3,252,060 | 5/1966 | Marino et al. | 174—52 |

LEWIS H. MYERS, *Primary Examiner.*

D. A. TONE, *Assistant Examiner.*

U.S. Cl. X.R.

317—234